United States Patent
Liu et al.

(10) Patent No.: US 11,490,049 B2
(45) Date of Patent: Nov. 1, 2022

(54) METHOD FOR SELECTING REFERENCE FRAME, ELECTRONIC DEVICE, AND STORAGE MEDIUM

(71) Applicant: AMLOGIC (SHANGHAI) CO., LTD., Shanghai (CN)

(72) Inventors: Yanling Liu, Shanghai (CN); Tao Ji, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/305,872

(22) Filed: Jul. 16, 2021

(65) Prior Publication Data

US 2022/0021841 A1 Jan. 20, 2022

(30) Foreign Application Priority Data

Jul. 17, 2020 (CN) .......................... 202010693440.5

(51) Int. Cl.
*H04N 7/01* (2006.01)

(52) U.S. Cl.
CPC ......... *H04N 7/0145* (2013.01); *H04N 7/0127* (2013.01)

(58) Field of Classification Search
CPC ...... H04N 7/0127; H04N 7/01; H04N 7/0147; H04N 7/0135; H04N 7/0145
USPC .......................... 348/441, 448–452, 458, 459
See application file for complete search history.

(56) References Cited

U.S. PATENT DOCUMENTS

| | | | |
|---|---|---|---|
| 8,953,685 B2* | 2/2015 | Dane | H04N 19/156 375/240.16 |
| 2008/0304568 A1 | 12/2008 | Chang | |
| 2010/0253838 A1 | 10/2010 | Garg et al. | |
| 2021/0407105 A1* | 12/2021 | Bao | H04N 7/014 |

OTHER PUBLICATIONS

Extended European Search Report from related Application No. 21185881.6 dated Dec. 7, 2021.

* cited by examiner

*Primary Examiner* — Sherrie Hsia
(74) *Attorney, Agent, or Firm* — Grossman, Tucker, Perreault & Pfleger, PLLC

(57) ABSTRACT

A method for selecting a reference frame, an electronic device, and a storage medium. The method includes: calculating a sum of absolute values of pixel brightness differences of corresponding pixel locations in a current frame and a previous frame in a video; determining frame attribute of the current frame based on the sum of absolute values of pixel brightness differences, the frame attribute including a raw frame and a duplicate frame; counting a number of raw frames in M historical frames previous to the current frame; obtaining a current frame interpolation step size based on the number of raw frames in the M historical frames; obtaining a next frame phase to be interpolated based on a current frame interpolation phase and the current frame interpolation step size; and determining an interpolation reference frame based on the next frame to be interpolated.

20 Claims, 3 Drawing Sheets

METHOD FOR SELECTING REFERENCE FRAME, ELECTRONIC DEVICE, AND STORAGE MEDIUM

CROSS-REFERENCE TO RELATED APPLICATION

This application is based on and claims priority to Chinese Patent Application No. 202010693440.5 filed on the Patent Office of the People's Republic of China on 17 Jul. 2020, the content of which is hereby incorporated by reference in its entirety into this disclosure.

FIELD

The disclosure relates to the field of video processing technologies, and more particularly to a method for selecting a reference frame, a non-transitory computer-readable storage medium, and an electronic device.

BACKGROUND

At present, a refresh rate of mainstream consumer-grade display devices such as mobile phones, computer screens, and TVs (televisions) may be above 60 HZ, but a current mainstream frame rate of movies is still 24 fps (frames per second) and a frame rate of TV video signals is generally 25 fps, because of various historical technical reasons. It is supposed that a TV with a refresh rate of 60 HZ is used to play a video source of 24 fps. Since 60 is not an integer multiple of 24, a 3:2 method is generally used for intermittently duplicating to play frames. That is, the first frame is played 2 times, the second frame is played 3 times, and such a cycle is repeated. In other words, a video of this movie mode is defined as a "32 mode" or "23 mode", and a sequence in each video cycle is defined as "1, 0, 1, 0, 0", where "1" represents a raw frame, "0" represents a duplicate frame same as a previous frame on a timeline. As illustrated in Table 1, "1" (A1, B1, C1) represents the raw frame, and "0" (A2, B2, B3, C2) represents the duplicate frame same as the previous frame on the timeline.

In the related art, non-duplicate frames may be usually selected as reference frames based on ordering rules of frames under a specific movie mode, and used to calculate various image features and related information in a time domain and a space domain. However, in the real complex environment, video sources in various movie modes may not be perfect. Some frames are lost due to video editing and splicing, and insufficient decoding capabilities of set-top boxes, or successive frames in a video stream under a certain movie mode may not be arranged based on ideal ordering rules due to various complex situations such as duplicate frames or errors of detecting the movie mode. If reference frames are selected based on the ordering rules of frames in a specific movie mode, it is easy to select non-raw frames, that is, it is easy to select duplicate frames as the reference frames, which will cause calculation errors on motion vectors to cause picture shaking or blurring and reduce the quality of video display.

SUMMARY

A method for selecting a reference frame is provided according to a first aspect of the disclosure. The method is for frame interpolation processing on frame rate conversion (FRC). The method includes: obtaining frames in a video; calculating a sum of absolute values of pixel brightness differences of corresponding pixel locations in a current frame and a previous frame; determining frame attribute of the current frame based on the sum of absolute values of pixel brightness differences, the frame attribute including a raw frame and a duplicate frame; counting a number of raw frames in M historical frames previous to the current frame; obtaining a current frame interpolation step size based on the number of raw frames in the M historical frames; obtaining a next frame phase to be interpolated based on a current frame interpolation phase and the current frame interpolation step size; and determining an interpolation reference frame based on the next frame to be interpolated.

A non-transitory computer-readable storage medium is provided according to a second aspect of the disclosure. The non-transitory computer-readable storage medium has stored therein a computer program. When the computer program is executed by a processor, the processor is caused to perform the method for selecting the reference frame according to the embodiments described above.

An electronic device is provided according to a third aspect of the disclosure. The electronic device includes a processor; a memory and a display, communicatively to couple to the processor. The memory is configured to store a computer program executable by the processor. The processor is configured to perform the method for selecting the reference frame according to the embodiments described above, and process a video stream based on the selected reference frame, and control the display to display video images after processing.

Additional aspects and advantages of the disclosure will be given in part in the following descriptions, become apparent in part from the following descriptions, or be learned from the practice of the disclosure.

BRIEF DESCRIPTION OF THE DRAWINGS

The described above and/or additional aspects and advantages of the disclosure will become apparent and more readily appreciated, from the following descriptions for embodiments made with reference to the accompanying drawings.

Figure 1:
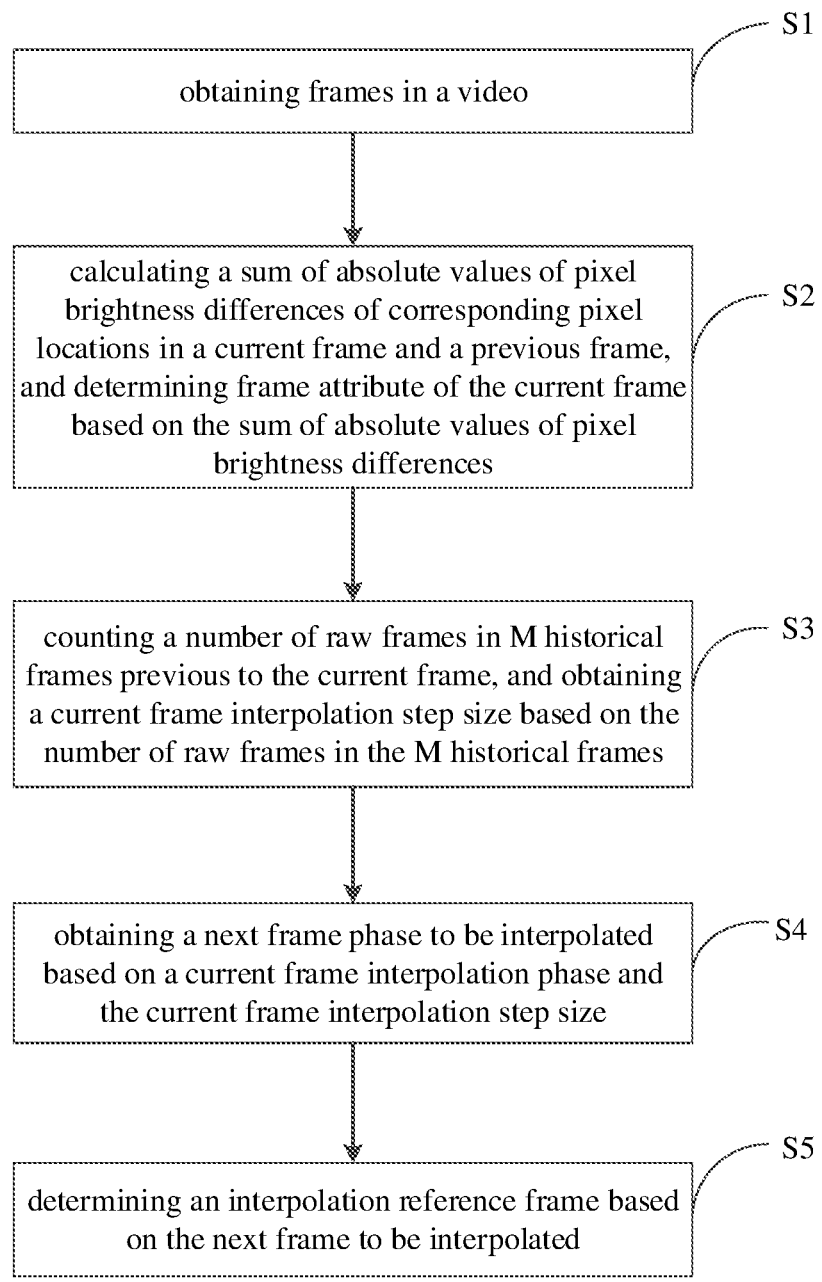
FIG. 1 is flow chart illustrating a method for selecting a reference frame according to some embodiments of the disclosure.

Reference numerals: electronic device 1; processor 2; memory 3.

DETAILED DESCRIPTION

Reference will be made in detail to embodiments of the disclosure. The embodiments described with reference to the drawings are exemplary. The embodiments of the disclosure will be described in detail below.

In order to ensure a good video processing effect on FRC (frame rate conversion) during performing FRC processing on video images, it is important to accurately estimate a motion vector of a moving object in the foreground. Selecting a video reference frame for calculating the motion vector may play a decisive role. If a wrong reference frame is selected to calculate and forecast a trajectory of the moving object in pictures, the motion vector may not be converge correctly, the estimated motion vector may have a bigger error with an actual moving trajectory of the moving object, and the pictures after the motion compensation may cause video shaking, screen tearing, and other after-effect, and lower the quality of video display.

In order to solve the above problems, a method for selecting a reference frame provided in a first aspect of embodiments of the disclosure may be described with reference to the drawings below, which may accurately select the reference frame during a calculation process of frame rate conversion (FRC), avoiding selecting duplicate frames as reference frames due to frame loss (or drop) or frame increment in the video, reducing occurrences of picture shaking or blurring, and improving the quality of video display.

The basic idea of the method for selecting the reference frame in some embodiments of the disclosure may be that, a current frame interpolation phase and a current frame interpolation step size may be dynamically changed by calculating, comparing, decision-making on information of each frame in an actual input video stream and information of historical frames, to adjust adaptively to select the reference frame, so as to accurately select the reference frame in the event of occurrences of frame loss (or drop) or other error conditions in the video, ensure that moving pictures remain smooth and natural, and improve the dynamic clarity of pictures.

FIG. 1 is flow chart illustrating a method for selecting a reference frame according to some embodiments of the disclosure. The method may be for frame interpolation processing on FRC. As illustrated in FIG. 1, the method for selecting the reference frame in some embodiments of the disclosure at least includes actions in blocks S1-S5 as follows.

In block S1, frames in a video are obtained.

In some embodiments, a video source may include a sequence of frames or images, for example, a certain sequence of images ordered in time.

In block S2, a sum of absolute values of pixel brightness differences of corresponding pixel locations in a current frame and a previous frame is calculated, and frame attribute of the current frame is determined based on the sum of absolute values of pixel brightness differences.

The frame attribute includes a raw frame and a duplicate frame. For example, Table 1 shows an arrangement of frames in a 32 mode. The video source is a set of sequences of frames, represented by theoretical flags, that is, "1" and "0", where "1" represents the raw frame and "0" represents the duplicate frame same as the previous frame on the timeline.

In some embodiments, for each frame at each moment in the video, the sum of absolute values of pixel brightness differences of corresponding pixel locations in the current frame and the previous frame in the timeline may be calculated to determine whether each frame of the input video stream is the raw frame or the duplicate frame in time.

TABLE 1

| video source | A1 | A2 | B1 | B2 | B3 | C1 | C2 | D1 | D2 | D3 |
|---|---|---|---|---|---|---|---|---|---|---|
| flag | 1 | 0 | 1 | 0 | 0 | 1 | 0 | 1 | 0 | 0 |

Figure 2:
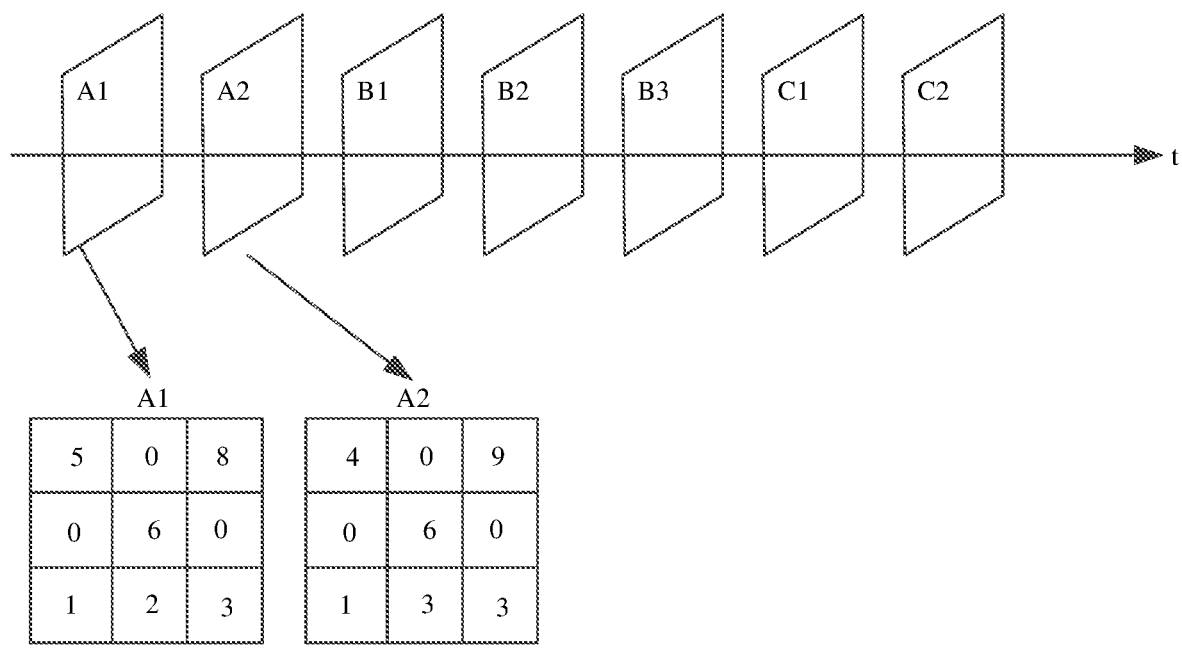
FIG. 2 is a schematic diagram illustrating calculating a pixel brightness difference between frames according to some embodiments of the disclosure.

For example, a brightness value of Y channel of each frame may be used to calculate a pixel brightness value between frames to obtain the sum of the absolute values of the pixel brightness differences. As illustrated in FIG. 2, the sum of the absolute values of the pixel brightness differences of the corresponding pixel locations may be calculated based on pixel brightness values of each corresponding pixel location in frame A1 and frame A2, and a calculation result is assigned to $dif_{sum}[A1, A2]=|5-4|+|0-0|+|8-9|+|0-0|+|6-6|+|0-0|+|1-1|+|2-3|+|3-3|=3$.

In block S3, a number of raw frames in M historical frames previous to the current frame is counted, and a current frame interpolation step size is obtained based on the number of raw frames in the M historical frames.

In some embodiment, raw frames in a certain period of time are counted, that is, the number of the raw frames in the M historical frames previous to the current frame is counted. The current frame interpolation step size may be adaptively and dynamically adjusted based on the statistical information data. That is, information that whether the M frames previous to the current frame along the timeline are the raw frames and the duplicate frames may be known based on the action in block S2, and the current frame interpolation step size may be calculated based on the statistical data, so as to predict a next frame phase to be interpolated.

In block S4, a next frame phase to be interpolated is obtained based on a current frame interpolation phase and the current frame interpolation step size.

In block S5, an interpolation reference frame is determined based on the next frame to be interpolated.

In some embodiment, the next frame phase to be interpolated may be calculated based on the current frame interpolation step size. The current frame interpolation phase may be obtained by combining frame information of the actual input source. That is, for each frame of the input video stream, information of the frame and information of historical frames may be compared to make decisions, and the current frame interpolation phase and the current frame interpolation step size may be changed dynamically, to adaptively select the appropriate interpolation reference frame in the input source, so that when the frame loss (or drop) in the video or other error conditions occur, it may still accurately select the reference frame to correct the frame phase. Therefore, the current frame interpolation phase and the current frame interpolation step size may be restored to normal, so as to ensure that the pictures remain smooth and natural after the FRC processing, achieve the purpose of accurately selecting the reference frame during the calculation process of FRC, avoid occurrences of picture shaking or blurring, and improve the dynamic clarity of the pictures.

With the method for selecting the reference frame provided in some embodiments of the disclosure, the current frame interpolation step size may be obtained based on the number of raw frames in the M historical frames, and the current frame interpolation step size is adaptively adjusted. The next frame phase to be interpolated is obtained based on the current frame interpolation phase and the current frame interpolation step size. The interpolation reference frame is determined based on the next frame to be interpolated. That is, the current frame interpolation phase and the current frame interpolation step size may be dynamically changed by calculating, comparing, decision-making on information of each frame in the actual input video stream and information of historical frames, to adjust adaptively to select the reference frame. Therefore, when the frame loss (or drop) in the video or other error conditions occur, it may still correct the frame phase, avoiding occurrences of picture shaking or blurring, maintaining the moving pictures smooth and natural, and improving the display quality of pictures.

In some embodiments of the method of the disclosure, determining the frame attribute of the current frame based on the sum of absolute values of pixel brightness differences includes: determining that the current frame is the raw frame in response that the sum of absolute values of pixel brightness differences is greater than a second brightness threshold, in which the second brightness threshold is an average value of a sum of absolute values of pixel brightness differences of the M historical frames previous to the current frame; or, determining that the current frame is the duplicate frame in response that the sum of absolute values of pixel brightness differences is not greater than the second brightness threshold.

The second brightness threshold may be changed adaptively based on the input video stream, which is not limited herein.

For example, as illustrated in FIG. 2, the sum of the absolute values of the pixel brightness differences of the corresponding pixel locations may be calculated based on pixel brightness values of each corresponding pixel location in frame A1 and frame A2, and the calculation result is assigned to dif_sum [M−1], where dif_sum represents an array of length M for storing information on the sum of absolute values of the M frames previous to the current frame along the timeline, and M is an integer greater than 0. The second brightness threshold may be the average of the array dif_sum [M−1], that is, the average value of the sum of absolute values of pixel brightness differences of the M historical frames previous to the current frame. When dif_sum [0] is greater than the second brightness threshold, it is considered that the frame is the raw frame, that is, flag2 [M−1] is equal to 1. Otherwise, it is considered that the frame is the duplicate frame, that is, flag2 [M−1] is equal to 0, where, flag2 represents an array of length M for storing information on the M frames previous to the current frame along the timeline.

the current frame interpolation step size is step=cnt2/M. For example, when M=10, and there is no exception, as shown in Table 2, the value of cnt2 in the 32 mode is 4, and the current frame interpolation step size is 0.4; if one raw frame is lost, as shown in Table 3, the value of cnt2 is 3, and the current frame interpolation step size is 0.3.

In some embodiments of the method of the disclosure, obtaining the next frame phase to be interpolated based on the current frame interpolation phase and the current frame interpolation step size includes: calculating a sum of the current frame interpolation phase and the current frame interpolation step size as the next frame phase to be interpolated.

In some embodiments of the method of the disclosure, determining the interpolation reference frame based on the next frame to be interpolated includes: skipping to a next raw frame of the current reference frame as the interpolation reference frame in response that the next frame to be interpolated is greater than a phase normalization threshold; or taking the current reference frame as the interpolation reference frame in response that the next frame to be interpolated is less than or equal to the phase normalization threshold.

In some embodiments of the method of the disclosure, the method further includes: calculating a phase difference between the next frame to be interpolated and the phase normalization threshold as a new next frame to be interpolated in response that the next frame to be interpolated is greater than the phase normalization threshold. That is, when the next frame to be interpolated is calculated, if the calculation result is greater than or equal to 1, the new next frame to be interpolated=the next frame to be interpolated−1. That is, the fractional part is taken.

In some embodiments of the method of the disclosure, the input video source is in a particular movie mode, and the movie mode of the video source is not easily changed or

TABLE 2

| video source | a | b | c | d | e | f | g | h | i | j | k | l | m | n | ... |
|---|---|---|---|---|---|---|---|---|---|---|---|---|---|---|---|
| flag | 1 | 0 | 1 | 0 | 0 | 1 | 0 | 1 | 0 | 0 | 1 | | | | ... |

TABLE 3

| | input frame | A1 | A2 | B1 | B2 | B3 | C1 | C2 | D1 | D2 | D3 | D4 | E1 | E2 | F1 | F2 | F3 | G1 |
|---|---|---|---|---|---|---|---|---|---|---|---|---|---|---|---|---|---|---|
| frame increment | flag2 | 1 | 0 | 1 | 0 | 0 | 1 | 0 | 1 | 0 | 0 | 0 | 1 | 0 | 1 | 0 | 0 | 1 |
| | reference frame 1 | | | | | | | | A1 | A1 | A1 | B1 | B1 | B1 | C1 | C1 | D1 | D1 |
| | reference frame 2 | | | | | | | | B1 | B1 | B1 | C1 | C1 | C1 | D1 | D1 | E1 | E1 |
| | frame interpolation result | | | | | | | | A | A.4 | A.8 | B.2 | B.5 | B.9 | C.2 | C.6 | D | D.3 |

In some embodiments of the method of the disclosure, obtaining the current frame interpolation step size based on the number of raw frames in the M historical frames includes: calculating a ratio of the number of raw frames in the M historical frames and M, as the current frame interpolation step size. That is, the number of such as values of "1" in the array flag2 of the M historical frames may be counted, and the result is assigned to the variable cnt2, and switched, and the situation of "frame loss (or drop)" or "frame increment" under the particular movie mode may be processed. Therefore, the method of the embodiments of the disclosure may further include: calculating absolute values of pixel brightness differences of corresponding pixel locations in the current frame and the previous frame, obtaining frame attribute statistical information of N historical frames previous to the current frame based on the absolute values of pixel brightness differences, and determining a movie mode of the video based on the frame attribute statistical information.

In some embodiments of the method of the disclosure, obtaining the frame attribute statistical information of the N historical frames previous to the current frame based on the absolute values of pixel brightness differences, and determining the movie mode of the video based on the frame attribute statistical information includes: counting a number of pixels whose absolute values of pixel brightness differences are greater than a first brightness threshold in the current frame; determining that the current frame is the raw frame in response that the number of pixels is greater than a first number threshold, or determining that the current frame is the duplicate frame in response that the number of pixels is not greater than the first number threshold; counting frame attribute of each historical frame in the N historical frames previous to the current frame to obtain a frame attribute sequence of the N historical frames; and determining the movie mode to which the current frame belongs based on frame attribute sequence of the N historical frames.

For example, due to complex and various video sources, the video mode of each video stream of the input end needs to be detected before the FRC processing. For each frame in each moment in the video, the absolute value of the brightness difference of each corresponding pixel location between the current frame and the previous frame along the timeline may be calculated, a number of pixels whose absolute values of pixel brightness differences are greater than the first brightness threshold in the whole picture may be counted. The statistical result is assigned to cnt1. When cnt1 is greater than the first number threshold, the current frame is considered to be the raw frame, that is, flag1 [N−1] is equal to 1, otherwise, the current frame is considered to be the duplicate frame, that is, flag1 [N−1] is equal to 0, where flag represents an array of length N, which is used to store information on the N frames previous to the current frame along the timeline, and N is an integer greater than 0.

In some embodiments, the first brightness threshold and the first number threshold may be set based on actual situations, which is not limited herein.

Furthermore, based on the current frame processed, information on flag1 of previous N frames along the timeline may be counted to determine the movie mode of the video source. Before the movie mode of the video source is not detected, the default is that each frame is the raw frame. For example, when N=10, as shown in Table 2, the kth frame is calculated currently. The information on flag1 [0] to flag1 [N−1] of previous N frames along the timeline is "1, 0, 1, 0, 0, 1, 0, 1, 0, 0", which conforms to the ordering rules of frames of the 32 mode. Therefore, it is determined that the video source may be the 32 mode from the kth frame.

The method for selecting the reference frame provided in some embodiments of the disclosure will be exemplified with reference to Table 3 and Table 4. The movie mode is the 32 mode, and M=10 as an example.

For the "frame increment" case shown in Table 3, frame D1 is repeated redundantly previous to frame E1, that is, frame D4. When the input frame E1 is processed, information on flag2 of the previous M historical frames along the timeline may be counted. The actual value of the number cnt2 of raw frames is one less than the theoretical value of the number cnt2 of raw frames, at this time, cnt2=3. The current frame interpolation step size may be step=cnt2/m=0.3, so that the next frame phase to be interpolated phase_next=0.2+0.3=0.5, that is, the next frame phase to be interpolated of frame E1 is B.5. Similarly, the next frame phase to be interpolated of frame E2 is B.9.

Based on the adjustment strategy of fixed frame interpolation step size and frame interpolation phase under the 32 mode, when the input frame F3 is processed, the phase of the output frame is 0. Before processing with the method in the embodiments of the disclosure, each frame in the input source is not reconstructed and detected, and D1 and D4 are incorrectly selected as reference frames. Therefore, the method according to the embodiments of the disclosure adopts the combination of the current frame interpolation step size and the current frame interpolation phase to correct and adjust adaptively. At the B.9 frame interpolation location, frame B1 and frame C1 may be selected continuously as the reference frames. Therefore, the frame interpolation step size may be dynamically and reciprocally adjusted. After frame H2, the current frame interpolation phase and the current frame interpolation step size may be corrected, so that the successive frames return to normal.

For the "frame increment" case shown in Table 4, duplicate frame D3 is lost previous to frame E1. Therefore, when the input frame E2 is processed, information on flag2 of the previous M historical frames along the timeline may be counted. The actual value of the number cnt2 of raw frames is one more than the theoretical value of the number cnt2 of raw frames, at this time, cnt2=5. The current frame interpolation step size may be step=cnt2/m=0.5, so that the next frame phase to be interpolated phase_next=0.2+0.4=0.7, that is, the next frame phase to be interpolated of frame F1 is B.7. Similarly, the next frame phase to be interpolated of frame F2 is C.1. So that after frame H2, the current frame interpolation phase and the current frame interpolation step size may be corrected, so that the successive frames return to normal.

In the above example description in some embodiments, the raw frame is used as the interpolation reference frame by default. It may be understood that the duplicate frame may also be used as the interpolation reference frame, which is not limited herein.

TABLE 4

| | input frame | A1 | A2 | B1 | B2 | B3 | C1 | C2 | D1 | D2 | E1 | E2 | F1 | F2 | F3 | G1 | G2 | H1 |
|---|---|---|---|---|---|---|---|---|---|---|---|---|---|---|---|---|---|---|
| frame loss | flag2 | 1 | 0 | 1 | 0 | 0 | 1 | 0 | 1 | 0 | 1 | 0 | 1 | 0 | 0 | 1 | 0 | 1 |
| | reference frame 1 | | | | | | | | A1 | A1 | A1 | B1 | B1 | C1 | C1 | D1 | D1 | D1 |
| | reference frame 2 | | | | | | | | B1 | B1 | B1 | C1 | C1 | D1 | D1 | E1 | E1 | E1 |
| | frame interpolation result | | | | | | | | A | A.4 | A.8 | B.2 | B.7 | C.1 | C.6 | D | D.4 | D.9 |

Figure 3:
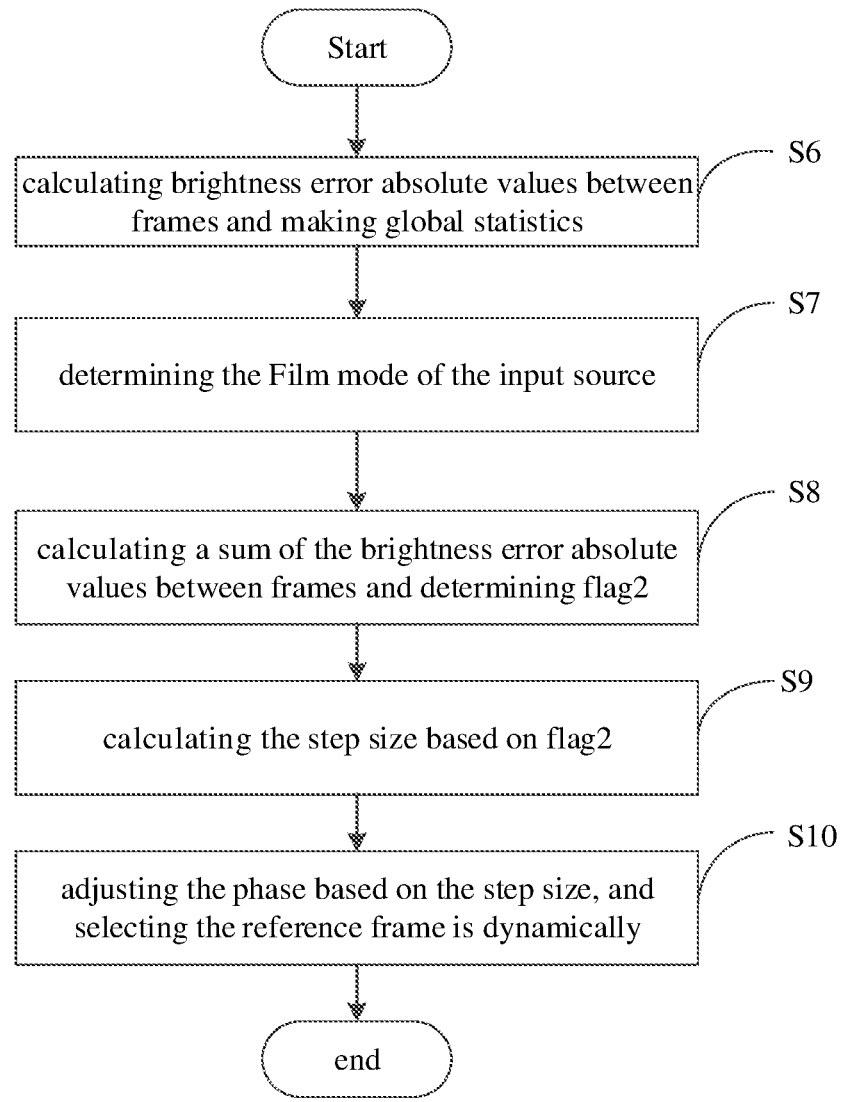
FIG. 3 is flow chart illustrating a method for selecting a reference frame according to some embodiments of the disclosure.

The method for selecting the reference frame provided in some embodiments of the disclosure will be further illustrated with reference to FIG. 3. The actions may be as follows.

In block S6, brightness error absolute values between frames are calculated and global statistics is made. That is, the absolute value of the pixel brightness difference in each corresponding pixel position between the current frame and the previous frame is calculated.

In block S7, the Film mode of the input source is determined. That is, the frame attribute statistical information of N historical frames previous to the current frame may be obtained based on the absolute values of the pixel brightness differences, and the movie mode of the video stream may be determined based on the frame attribute statistical information.

In block S8, a sum of the brightness error absolute values between frames is calculated and flag2 is determined. That is, the frame attribute of the current frame is determined based on the sum of absolute values of pixel brightness differences. If it is the original frame, flag2 is equal to 1; if it is the duplicate frame, lag2 is equal to 0.

In block S9, the step size is calculated based on flag2, that is, a ratio of the number of raw frames in the M historical frames and M is calculated, as the current frame interpolation step size.

In block S10, the phase is adjusted based on the step size, that is, a sum of the current frame interpolation phase and the current frame interpolation step size is calculated as the next frame phase to be interpolated, and the reference frame is dynamically selected.

Therefore, the method provided in some embodiments of the disclosure dynamically adjusts the value of the frame interpolation step size by reciprocating. Due to the adaptive adjustment of the frame interpolation step size, the selection of the new frame interpolation reference frame may be accurately adjusted, thereby avoiding occurrences of picture shaking or blurring caused by frame loss (or drop) or other error conditions, and remaining the motion pictures after FRC processing smooth and natural.

According to a second aspect of embodiments of the disclosure, a non-transitory computer-readable storage medium is provided. The non-transitory computer-readable storage medium has stored therein a computer program. When the computer program is executed by a processor, the processor is caused to perform the method for selecting the reference frame according to the embodiments described above.

Figure 4:
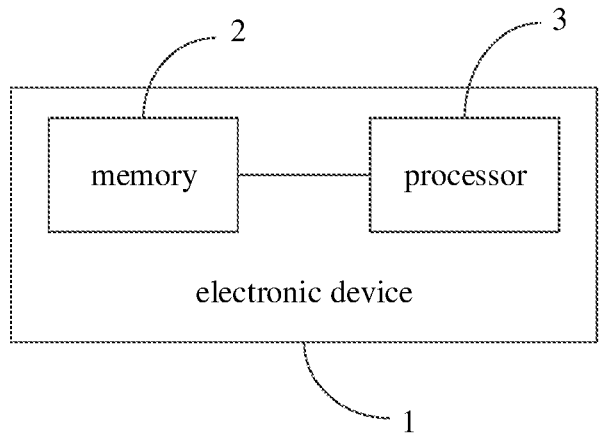
FIG. 4 is a block diagram illustrating an electronic device according to some embodiments of the disclosure.

According to a third aspect of embodiments of the disclosure, an electronic device is provided. As illustrated in FIG. 4, the electronic device 1 of some embodiments of the disclosure includes a processor 2 and a memory 3 communicatively coupled to the processor 2. In some embodiments of the disclosure, the electronic device 1 may include a video display device such as a television, a computer, or other devices that perform FRC processing.

The memory 3 is configured to store a computer program executable by the processor 2. The processor 2 is configured to execute the computer program to perform the method for selecting the reference frame according to the embodiments described above. For example, when the processor 2 performs frame interpolation processing on FRC, the processor 2 obtains the reference frame according to the method of selecting the reference frame in the above embodiments, uses the reference frame to perform the frame interpolation compensation on the input frame to avoid picture shaking or blurring caused by improper reference frame selection. For the method of selecting the reference frame, reference may be made to the specific description of the above embodiments.

With the electronic device 1 provided in the embodiments of the disclosure, the method of selecting the reference frame may be performed by the processor 3, avoiding occurrences of picture shaking or blurring caused by frame loss (or drop) or other error situations in the video, maintaining the moving pictures smooth and natural, and improving the dynamic clarity of pictures.

In the specification of the disclosure, any process or method described in a flow chart or described herein in other ways may be understood to include one or more modules, segments or portions of codes of executable instructions for achieving specific logical functions or steps in the process, and the scope of a preferred embodiment of the disclosure includes other implementations, which may not be performed in the order shown or discussed, including in a substantially simultaneous manner or in a reverse order according to involved functions, and should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although the embodiments of the disclosure have been shown and described above, it should be understood that the above embodiments are exemplary and should not be construed as limiting the disclosure. Those skilled in the art may change, modify, and substitute the embodiments within the scope of the disclosure.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A method for selecting a reference frame, for frame interpolation processing on frame rate conversion FRC, comprising:
    calculating a sum of absolute values of pixel brightness differences of corresponding pixel locations in a current frame and a previous frame in a video;
    determining frame attribute of the current frame based on the sum of absolute values of pixel brightness differences, the frame attribute comprising a raw frame and a duplicate frame; counting a number of raw frames in M historical frames previous to the current frame along a timeline, wherein M is an integer greater than 0;
    obtaining a current frame interpolation step size based on the number of raw frames in the M historical frames;
    obtaining a next frame phase to be interpolated based on a current frame interpolation phase and the current frame interpolation step size; and
    determining an interpolation reference frame based on the next frame to be interpolated.

2. The method as claimed in claim 1, wherein determining the frame attribute of the current frame based on the sum of absolute values of pixel brightness differences comprises:
    determining that the current frame is the raw frame in response that the sum of absolute values of pixel brightness differences is greater than a second brightness threshold, the second brightness threshold being an average value of a sum of absolute values of pixel brightness differences of the M historical frames previous to the current frame along the timeline; or
    determining that the current frame is the duplicate frame in response that the sum of absolute values of pixel brightness differences is not greater than the second brightness threshold.

3. The method as claimed in claim 1, wherein obtaining the current frame interpolation step size based on the number of raw frames in the M historical frames comprises:
    calculating a ratio of the number of raw frames in the M historical frames and M, as the current frame interpolation step size.

4. The method as claimed in claim 1, wherein obtaining the next frame phase to be interpolated based on the current frame interpolation phase and the current frame interpolation step size comprises:
    calculating a sum of the current frame interpolation phase and the current frame interpolation step size as the next frame phase to be interpolated.

5. The method as claimed in claim 1, wherein determining the interpolation reference frame based on the next frame to be interpolated comprises:
    skipping to a next raw frame of the current reference frame as the interpolation reference frame in response that the next frame to be interpolated is greater than a phase normalization threshold; or
    taking the current reference frame as the interpolation reference frame in response that the next frame to be interpolated is less than or equal to the phase normalization threshold.

6. The method as claimed in claim 5, further comprising:
    calculating a phase difference between the next frame to be interpolated and the phase normalization threshold as a new next frame to be interpolated in response that the next frame to be interpolated is greater than the phase normalization threshold.

7. The method as claimed in claim 1, further comprising:
    calculating absolute values of pixel brightness differences of corresponding pixel locations in the current frame and the previous frame, obtaining frame attribute statistical information of N historical frames previous to the current frame along the timeline based on the absolute values of pixel brightness differences, and determining a movie mode of the video based on the frame attribute statistical information, wherein N is an integer greater than 0.

8. The method as claimed in claim 7, wherein obtaining the frame attribute statistical information of the N historical frames previous to the current frame along the timeline based on the absolute values of pixel brightness differences, and determining the movie mode of the video based on the frame attribute statistical information comprises:
    counting a number of pixels whose absolute values of pixel brightness differences are greater than a first brightness threshold in the current frame;
    determining that the current frame is the raw frame in response that the number of pixels is greater than a first number threshold, or determining that the current frame is the duplicate frame in response that the number of pixels is not greater than the first number threshold;

counting frame attribute of each historical frame in the N historical frames previous to the current frame along the timeline to obtain a frame attribute sequence of the N historical frames; and determining the movie mode to which the current frame belongs based on frame attribute sequence of the N historical frames.

9. A non-transitory computer-readable storage medium having stored therein a computer program that, when executed by a processor, causes the processor to perform a method for selecting a reference frame, the method being for frame interpolation processing on frame rate conversion FRC and comprising:

calculating a sum of absolute values of pixel brightness differences of corresponding pixel locations in a current frame and a previous frame in a video;

determining frame attribute of the current frame based on the sum of absolute values of pixel brightness differences, the frame attribute comprising a raw frame and a duplicate frame;

counting a number of raw frames in M historical frames previous to the current frame along a timeline, wherein M is an integer greater than 0;

obtaining a current frame interpolation step size based on the number of raw frames in the M historical frames;

obtaining a next frame phase to be interpolated based on a current frame interpolation phase and the current frame interpolation step size; and determining an interpolation reference frame based on the next frame to be interpolated.

10. The non-transitory computer-readable storage medium as claimed in claim 9, wherein determining the frame attribute of the current frame based on the sum of absolute values of pixel brightness differences comprises:

determining that the current frame is the raw frame in response that the sum of absolute values of pixel brightness differences is greater than a second brightness threshold, the second brightness threshold being an average value of a sum of absolute values of pixel brightness differences of the M historical frames previous to the current frame along the timeline; or determining that the current frame is the duplicate frame in response that the sum of absolute values of pixel brightness differences is not greater than the second brightness threshold.

11. The non-transitory computer-readable storage medium as claimed in claim 9, wherein obtaining the current frame interpolation step size based on the number of raw frames in the M historical frames comprises:

calculating a ratio of the number of raw frames in the M historical frames and M, as the current frame interpolation step size.

12. The non-transitory computer-readable storage medium as claimed in claim 9, wherein obtaining the next frame phase to be interpolated based on the current frame interpolation phase and the current frame interpolation step size comprises:

calculating a sum of the current frame interpolation phase and the current frame interpolation step size as the next frame phase to be interpolated.

13. The non-transitory computer-readable storage medium as claimed in claim 9, wherein determining the interpolation reference frame based on the next frame to be interpolated comprises:

skipping to a next raw frame of the current reference frame as the interpolation reference frame in response that the next frame to be interpolated is greater than a phase normalization threshold; or taking the current reference frame as the interpolation reference frame in response that the next frame to be interpolated is less than or equal to the phase normalization threshold.

14. The non-transitory computer-readable storage medium as claimed in claim 13, wherein the method further comprises:

calculating a phase difference between the next frame to be interpolated and the phase normalization threshold as a new next frame to be interpolated in response that the next frame to be interpolated is greater than the phase normalization threshold.

15. The non-transitory computer-readable storage medium as claimed in claim 9, wherein the method further comprises:

calculating absolute values of pixel brightness differences of corresponding pixel locations in the current frame and the previous frame, obtaining frame attribute statistical information of N historical frames previous to the current frame along the timeline based on the absolute values of pixel brightness differences, and determining a movie mode of the video based on the frame attribute statistical information, wherein N is an integer greater than 0.

16. The non-transitory computer-readable storage medium as claimed in claim 15, wherein obtaining the frame attribute statistical information of the N historical frames previous to the current frame along the timeline based on the absolute values of pixel brightness differences, and determining the movie mode of the video based on the frame attribute statistical information comprises:

counting a number of pixels whose absolute values of pixel brightness differences are greater than a first brightness threshold in the current frame;

determining that the current frame is the raw frame in response that the number of pixels is greater than a first number threshold, or determining that the current frame is the duplicate frame in response that the number of pixels is not greater than the first number threshold;

counting frame attribute of each historical frame in the N historical frames previous to the current frame along the timeline to obtain a frame attribute sequence of the N historical frames; and determining the movie mode to which the current frame belongs based on frame attribute sequence of the N historical frames.

17. An electronic device, comprising:

a processor;

a memory and a display, communicatively coupled to the processor, wherein:

the memory is configured to store a computer program executable by the processor, and the processor is configured to perform a method for selecting a reference frame, and process a video stream based on the selected reference frame, and control the display to display video images after processing, in which the method for frame interpolation processing on frame rate conversion FRC and comprising:

calculating a sum of absolute values of pixel brightness differences of corresponding pixel locations in a current frame and a previous frame in a video;

determining frame attribute of the current frame based on the sum of absolute values of pixel brightness differences, the frame attribute comprising a raw frame and a duplicate frame;

counting a number of raw frames in M historical frames previous to the current frame along a timeline, wherein M is an integer greater than 0;

obtaining a current frame interpolation step size based on the number of raw frames in the M historical frames;

obtaining a next frame phase to be interpolated based on a current frame interpolation phase and the current frame interpolation step size; and determining an interpolation reference frame based on the next frame to be interpolated.

18. The electronic device as claimed in claim 17, wherein determining the frame attribute of the current frame based on the sum of absolute values of pixel brightness differences comprises:

determining that the current frame is the raw frame in response that the sum of absolute values of pixel brightness differences is greater than a second brightness threshold, the second brightness threshold being an average value of a sum of absolute values of pixel brightness differences of the M historical frames previous to the current frame along the timeline; or determining that the current frame is the duplicate frame in response that the sum of absolute values of pixel brightness differences is not greater than the second brightness threshold.

19. The electronic device as claimed in claim 17, wherein obtaining the current frame interpolation step size based on the number of raw frames in the M historical frames comprises:

calculating a ratio of the number of raw frames in the M historical frames and M, as the current frame interpolation step size.

20. The electronic device as claimed in claim 17, wherein obtaining the next frame phase to be interpolated based on the current frame interpolation phase and the current frame interpolation step size comprises:

calculating a sum of the current frame interpolation phase and the current frame interpolation step size as the next frame phase to be interpolated.

\* \* \* \* \*